(12) United States Patent
Hawley et al.

(10) Patent No.: US 11,173,885 B2
(45) Date of Patent: Nov. 16, 2021

(54) STANDSTILL MANAGEMENT YAW MITIGATION ON LOW MU GRADES

(71) Applicant: ZF Active Safety US Inc., Livonia, MI (US)

(72) Inventors: Shawn Hawley, Ann Arbor, MI (US); Arun Varadarajan, Farmington Hills, MI (US)

(73) Assignee: ZF Active Safety US Inc., Livonia, MI (US)

( * ) Notice: Subject to any disclaimer, the term of this patent is extended or adjusted under 35 U.S.C. 154(b) by 25 days.

(21) Appl. No.: 16/958,172

(22) PCT Filed: Dec. 26, 2018

(86) PCT No.: PCT/US2018/067499
§ 371 (c)(1),
(2) Date: Jun. 26, 2020

(87) PCT Pub. No.: WO2019/133604
PCT Pub. Date: Jul. 4, 2019

(65) Prior Publication Data
US 2020/0361432 A1    Nov. 19, 2020

Related U.S. Application Data

(60) Provisional application No. 62/611,898, filed on Dec. 29, 2017.

(51) Int. Cl.
*B60T 8/1755*  (2006.01)
*B60T 8/24*    (2006.01)
*B60T 8/32*    (2006.01)

(52) U.S. Cl.
CPC ............ *B60T 8/1755* (2013.01); *B60T 8/245* (2013.01); *B60T 8/32* (2013.01); *B60T 2201/06* (2013.01);
(Continued)

(58) Field of Classification Search
CPC .......... B60T 8/1755; B60T 8/245; B60T 8/32; B60T 2201/06; B60T 2210/12; B60T 2250/03; B60T 2210/124; B60T 8/24
See application file for complete search history.

(56) References Cited

U.S. PATENT DOCUMENTS

| | | |
|---|---|---|
| 8,764,124 B2 | 7/2014 | Furuyama |
| 9,120,470 B2 | 9/2015 | Harada |

(Continued)

FOREIGN PATENT DOCUMENTS

JP     2002264792 A    9/2002

*Primary Examiner* — Russell Frejd
(74) *Attorney, Agent, or Firm* — Robert James Harwood

(57) ABSTRACT

A stability control system of a vehicle utilizing an electronic control unit that detects a yaw condition while each of the wheel brakes are actuated by EBCM and the wheel speeds are zero. An electronic control unit includes an electronic braking control module that controls actuation and de-actuation of vehicle brakes on an inclined surface. A yaw condition is identified while all vehicle brakes are actuated on the inclined surface and each wheel speed is zero. The electronic control unit identifies which uphill wheel is leading a direction of the yaw and identifies a wheel of an opposing axle diagonal to the identified uphill wheel. The electronic control unit in cooperation with the electronic braking control module de-actuates the vehicle brakes of the identified uphill wheel and diagonal wheel to increase a side friction to the identified diagonal wheels to reduce further yawing of the vehicle.

18 Claims, 3 Drawing Sheets

(52) U.S. Cl.
CPC ....... *B60T 2210/12* (2013.01); *B60T 2250/03* (2013.01)

(56) References Cited

U.S. PATENT DOCUMENTS

| | | |
|---|---|---|
| 2010/0318255 A1 | 12/2010 | Li et al. |
| 2017/0066451 A1 | 3/2017 | Moran et al. |
| 2018/0111607 A1* | 4/2018 | Fujita ................. B60W 40/072 |

* cited by examiner

STANDSTILL MANAGEMENT YAW MITIGATION ON LOW MU GRADES

CROSS REFERENCE TO RELATED APPLICATIONS

This application is a national stage of International Application No. PCT/US2018/067499, filed Dec. 26, 2018, the disclosure of which is incorporated herein by reference in its entirety, and which claimed priority to U.S. Provisional Patent Application No. 62/611,898, filed Dec. 29, 2017, the disclosure of which is incorporated herein by reference in its entirety.

BACKGROUND OF THE INVENTION

The present invention relates in general to stability control systems that provide stability controls during standstill management of a vehicle with electronic brake control brake pressure trapping including, but not limited to, Hill start assist, automated or adaptive cruise control hold at stop condition, Auto Vehicle Hold, Crawl mode.

Many vehicles controls now include electronic stability controls that are used to maintain a stability of the vehicle particularly when operating in a respective operating mode like Hill start assist, Crawl mode, Auto Vehicle Hold, etc. These controls such as Hill start assist functionality includes brake pressure trapping that are techniques commonly used to implement hill start controls. In hill start operations for example, the vehicle brakes are locked 13 i.e., wheel brakes are engaged and the wheel has zero speed—where the vehicle is temporarily stopped on an incline such as at a stop sign, stop light, or stopped in traffic.

However, prior to commencement of the acceleration for a hill start operation while all vehicle brakes are actuated for preventing rollback movement of the vehicle in a downhill direction, if the inclined surface has low mu where the friction between the road and the tires cannot hold the vehicle in a stationary position, vehicle may begin to slide on the inclined surface with all wheels locked. The vehicle sliding backwards and yawing sideways may cause the driver to quickly and heavily throttle the engine, which may further cause stability issues from applying too much engine torque resulting in wheel slip on a low mu surface.

This same issue can be present in a Crawl mode where braking is applied autonomously when the driver takes its foot off the accelerator. In certain instances, depending how long the foot, or an autonomous driving system, is off the accelerator, the system may apply braking long enough such that the brakes are locked and the vehicle is not moving. Under these conditions if the vehicle is traveling on an incline (uphill and downhill), if a low mu surface is present, the vehicle could begin to yaw and slide while the vehicle brakes are locked.

SUMMARY OF THE INVENTION

An advantage of the invention is a detection of a vehicle yaw condition when the vehicle is at a momentary standstill while the vehicle brakes are actuated, where less than all wheel brakes are thereafter de-actuated to reduce the vehicle yaw. The technique determines a direction of the vehicle yaw and identifies the uphill wheel leading the yaw. The uphill wheel leading the yaw and a wheel diagonal to the identified uphill wheel are de-actuated while the other wheels remain actuated. The de-actuated wheels increase a side friction force between the tire and the surface of the road for reducing the yaw condition. By only de-actuating two of the four vehicle brakes, the system maintains approximately half of the longitudinal braking force to reduce the amount of acceleration and speed that the vehicle experiences in traveling against the driver's intended direction of travel relative to releasing all brake actuators. This also reduces the likelihood of an engine stall event and provides a more secure sensation to the driver of the vehicle that the system did not abruptly abandon the driver, in contrast to the scenario where all four brake actuators are released The invention contemplates a stability control system of a vehicle utilizing an electronic control unit that detects a yaw condition while each of the wheel brakes are actuated and the wheel speeds are zero. The stability control system reduces the yaw condition. A plurality of wheel speed sensors measure each of the vehicle wheel speed. A yaw sensor determines a yaw condition. An electronic control unit includes an electronic braking control module. The electronic braking control module controls actuation and de-actuation of vehicle brakes on an inclined surface. During a stop operation on the inclined surface while each wheel brake is actuated to maintain a zero wheel speed, a yaw condition is determined in response to yaw sensor data. The electronic control unit identifies which uphill wheel is leading a direction of the yaw and identifies a wheel of an opposing axle diagonal to the identified uphill wheel. The electronic control unit in cooperation with the electronic braking control module de-actuates the vehicle brakes of the identified uphill wheel and respective diagonal wheel to increase a side friction or lateral grip to the identified diagonal wheels to reduce further yawing of the vehicle.

The invention contemplates a method of maintaining vehicle stability during a hill start assist operation. The vehicle includes hill start assist functionality utilizing an electronic braking control module that assists a vehicle transitioning from a rest state to propelling the vehicle up a sloped surface while minimizing rollback of the vehicle after a brake release by the driver or an autonomous driving system. All vehicle brakes are actuated during a hill start assist operation. Wheel speeds of each of the plurality of wheels using wheel speed sensors are measured. A yaw condition is determined of the vehicle, by a yaw sensor, while the wheel speed sensors indicate a zero wheel speed. An electronic stability control unit identifies which uphill wheel is leading a direction of the yaw and identifying a wheel of an opposite axle diagonal to the identified uphill wheel. The vehicle brakes of the identified uphill wheel and identified diagonal wheel of the opposing axle are de-actuated using the electronic stability control unit in cooperation with the electronic braking control module to increase a side friction or lateral grip of the identified wheels to reduce further yawing of the vehicle.

Other advantages of this invention will become apparent to those skilled in the art from the following detailed description of the invention and preferred embodiments, when read in light of the accompanying drawings.

DETAILED DESCRIPTION OF THE INVENTION

Figure 1:
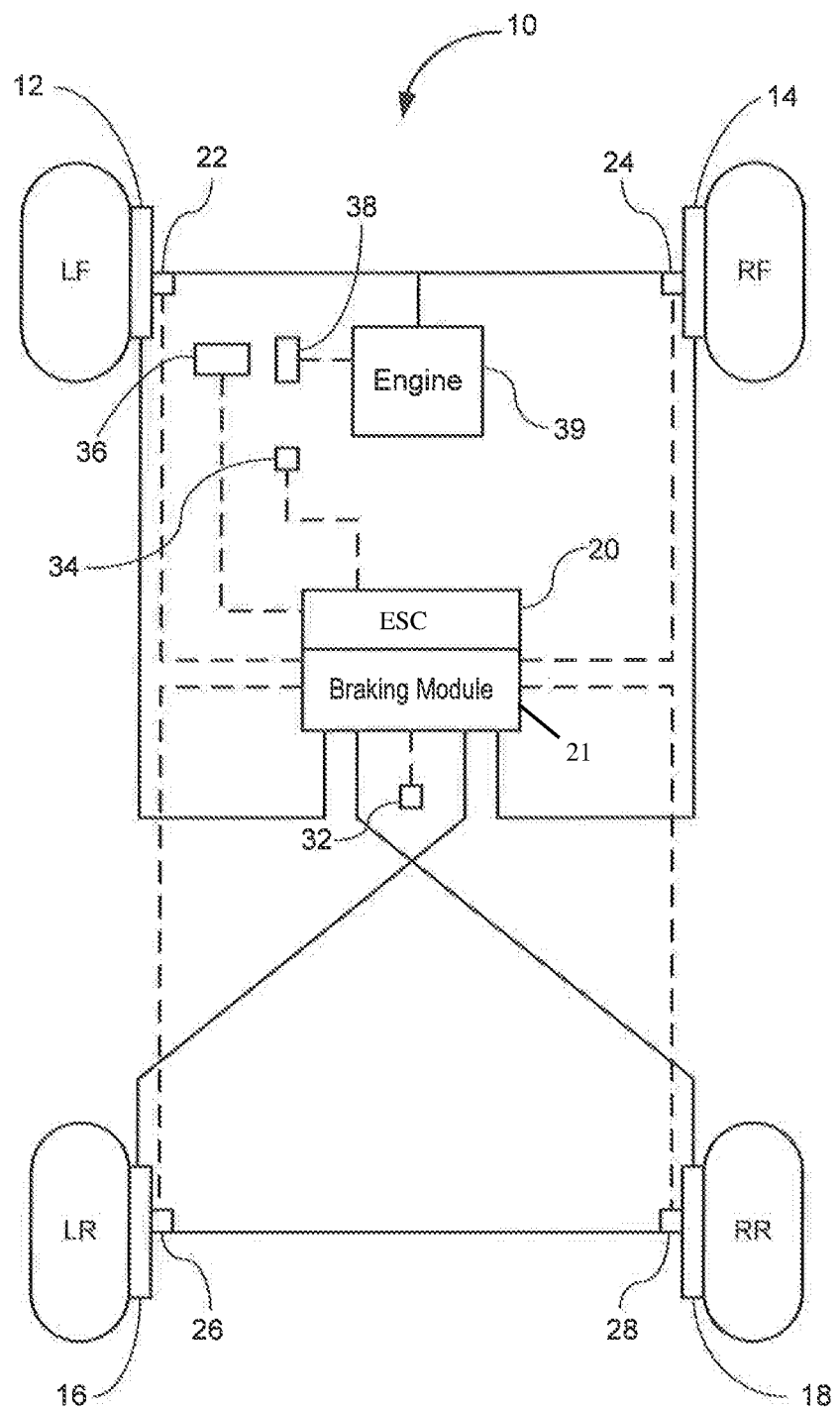
FIG. 1 is a schematic of a vehicle having a stability control system via an electronic braking control module.

Referring now to the drawings; there is shown in FIG. 1 a vehicle 10 having a stability control system in accordance with the invention for stability controls. The stability control system may suitably be used on a ground vehicle such as an automotive vehicle having four wheels and a brake for each wheel.

The vehicle is equipped with a plurality of vehicle wheels LF, RF, LR, and RR and a plurality of brake actuators 12, 14, 16, and 18 for braking an associated wheel. The plurality of brake actuators 12-18 are controlled by an electronic stability control unit (ESC) 20 that includes an electronic brake control module (EBCM) 21. EBCM 21 or similar module is a device that monitors and controls electronic braking functionality. The brake actuators 12-18 are not limited to any specific brake arrangement—e.g., a diagonal split arrangement or a front/rear split arrangement.

The ESC 20 receives inputs from various sensors including, but not limited to, the wheel speed sensors 22, 24, 26, and 28, a yaw sensor 32, and a sensor 34 determining an incline of a surface the vehicle 10 is on. The ESC 20 monitors the speed of each wheel and based on speed and detected wheel slip conditions, a braking strategy, anti-lock braking strategy, or traction control strategy is applied in actuating the vehicle brakes by the EBCM 21.

The yaw sensor 32 is a gyroscopic device that measures a vehicle's angular velocity around its vertical axis. The angle between the vehicle's heading and vehicle actual movement direction is called slip angle, which is related to the yaw rate.

The sensor 34 calculates or measures an angle (degree) of a slope of a traveled surface relative to an artificial horizontal horizon. The slope may also be referred to as an angle, tilt, gradient, pitch, or level of the road surface. The incline is typically a measurement identified by "degree" or "percent."

While the embodiment described herein relates to Hill start assist technology, it should be understood that system and method described herein can apply to other system operations that include, but not limited to, automated cruise control hold at stop condition, Auto Vehicle Hold, and Crawl mode where the vehicle brakes are locked on an incline surface and the vehicle begins to yaw while the vehicle brakes are locked—i.e., the wheel brakes are applied and the wheels have zero speed.

Hill start assist technology further includes hill start assist technology or other similar technologies that utilize an electronic control unit such as the ESC 20 along with the above modules, components, and sensors to assist in transitioning the vehicle from a resting state to propelling the vehicle up the inclined surface without experiencing rollback. Hill start assist operations maintain the vehicle brakes 12-18 in an actuated position for a short duration of time after the driver has manually released a brake foot pedal 36 or an autonomous driving system has released the brakes. This prevents the vehicle 10 from rolling backwards during the time the driver removes the driver's foot from the brake foot pedal 36 to the time when the driver pushes on an acceleration pedal 38 to increase the throttle for generating torque in the engine 39 to propel the vehicle 10 in an uphill ascent. As used herein "driver" includes any automated system providing throttle and braking commands—e.g., an autonomous driving system. Under such conditions, the brake actuators 12-18 are maintained in an actuated state until either a predetermined time elapses after the brake pedal is released or after a set of conditions are present (e.g., the engine has generated a presumed to be sufficient amount of engine or propulsive torque to begin propelling the vehicle in an uphill ascent).

While the brake actuators 12-18 are in the actuated position and the vehicle 10 is in a rest position on a sloped incline, if the coefficient of friction of the road surface is low (e.g., loose dirt, gravel, snow, or ice), the vehicle could have a tendency of sliding down the inclined surface while the vehicle wheels are not rotating. Under such conditions, the wheel speed sensors 22-28 indicate no rotational speed of the vehicle wheels whereas the yaw sensor 32 would indicate a yawing of the vehicle. The ESC 20 would receive these respective inputs and determine that the vehicle is sliding down the hill and rotating sideways relative to the desired travel direction. While an option would be to de-actuate all the brakes to allow the vehicle tires to regain lateral grip of the road surface (i.e., increasing side friction force) to recover from the unstable condition, such an operation could cause rapid rollback depending on the degree of the incline and the driver possibly could input a large throttle due to the quick release of all braking which would cause a large surge in the wheel speed which can further result in wheel slip as well as uneasiness for the driver or passenger. As used herein, "rollback" includes any rolling movement on an incline that is opposite a driver's intended direction indicated by the driver's gear selection.

In contrast to de-actuating all four of the vehicle brake actuators 12-18, the embodiments described herein de-actuate less than all four brake actuators 12-18. For example, a yaw condition is determined in response to the yaw data received from the yaw sensor 32 as a result of the sliding of the vehicle 10. The yaw condition may be the result of the road being uneven, different mu conditions on the inclined surface, or uneven loading of the vehicle due to the vehicle mass, passengers, or hauling contents.

In response to detecting the yawing condition while all vehicle brake actuators 12-18 are actuated, the ESC 20 in cooperation with the EBCM 21 de-actuates two of the brake actuators of two wheels and maintains actuation on the other two brake actuators of the opposing wheels. As described earner, the vehicle will yaw in a respective direction based on a split-mu surface, weighting of the vehicle, or the initial orientation relative to the grade—e.g., travelling across the incline. This could result in a clockwise direction yaw or a counterclockwise direction yaw. Depending on the direction of the yaw, one of the uphill wheels leading the yaw will become closer to the bottom of the hill relative to the other wheel on the same axle. The uphill wheel that is identified as the wheel leading the yaw will have its brake actuator de-actuated. In addition, the brake actuator of the wheel that is diagonal to the uphill wheel is also de-actuated. When vehicle brakes are in the actuated position, there will be substantially no additional side friction forces acting on the tire of these wheels. However, by de-actuating brakes on the identified wheels, these respective wheels are allowed to rotate and side friction forces are increased to these respective wheels. As a side friction force increases, the vehicle is able to regain lateral grip. The opposing wheels to the de-actuated wheels are still actuated and the likelihood of increasing the side friction force to the wheels is low. As a result, by increasing the lateral grip to the leading uphill wheel and allowing the wheel on the same axle to slide, a counter yaw is generated for correcting the original yawing condition. As a result, actuation of the brakes on the wheels opposite to the identified wheels—i.e., opposite to the uphill tire and the diagonal downhill tire—is maintained to assist in overcoming the yaw condition and maintain approximately half of the longitudinal braking force to reduce the amount of acceleration and speed that the vehicle experiences in traveling backwards—i.e., against the drivers intended direction of travel—relative to the scenario where all brake actuators are released. This also reduces the likelihood of an engine stall event and provides a more secure sensation to the driver of the vehicle that the system did not abruptly abandon the driver, in contrast to the scenario where all four brake actuators are released.

Figure 2:
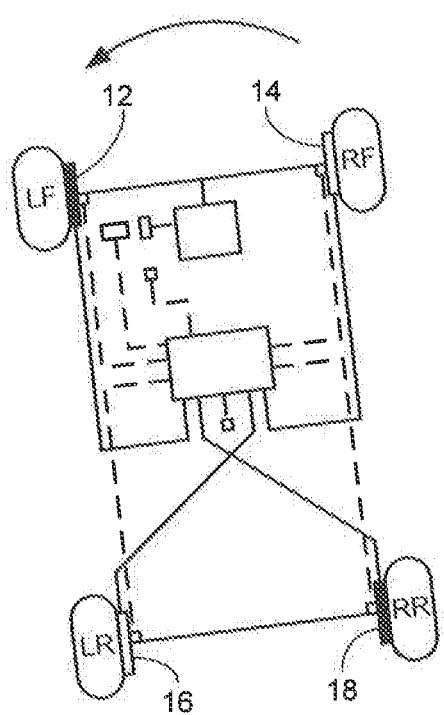
FIG. 2 illustrates a vehicle yawing in a counterclockwise direction.

FIG. 2 illustrates a vehicle yawing in a counterclockwise direction. As the vehicle begins to slide with all vehicle brake actuators engaged, the system determines the yaw direction of the vehicle based on data supplied by the yaw sensor. In response to determining that the vehicle is yawing to the left (i.e., counterclockwise), a determination is made that the LF wheel is leading the yaw as opposed to the RE wheel due to the yawing in the counterclockwise direction. The vehicle brake actuator is de-actuated on the LE wheel since this wheel is the leading uphill wheel in the direction of the yaw. In addition, the brake actuator of the downhill wheel diagonal to the LF wheel is de-actuated, which is the brake actuator of the RR wheel. By de-actuating the brake actuators of the LE wheel and RR wheel and allowing these tires to rotate, this provides an opportunity for the tires of the LF and RR wheels to regain lateral grip due to increasing the side friction force acting on these wheels. While the lateral grip of the LF and RR wheels are able to gain lateral traction to reduce these wheels from sliding, the opposing wheels RF and LR do not experience additional side friction forces and are able to slide. A moment is created between the LF and RR wheels experiencing lateral grip and the opposing wheels RF and LR that are able to slide where a counter yaw is created to regain vehicle stability. In addition, the de-actuation of the only half of the brake actuators reduce the downhill acceleration and speed of the vehicle as compared to a full brake dump, which is less startling to the driver and assists in resisting yaw, and enables the driver to apply a slower and lower throttle input, in contrast to a full brake dump, to regain an uphill movement of the vehicle.

Figure 3:
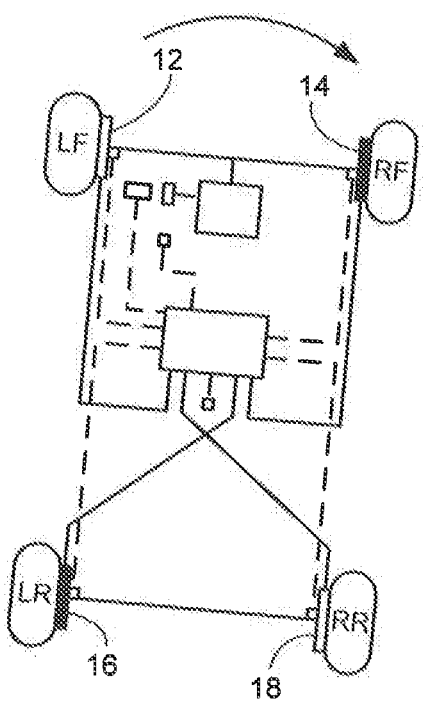
FIG. 3 illustrates a vehicle yawing in a clockwise direction.

FIG. 3 illustrates a vehicle yawing in a clockwise direction. In response to determining that the vehicle is yawing to the right, a determination is made that the RF wheel is leading the yaw as opposed to the LF wheel due to the yawing in the clockwise direction. The vehicle brake actuator on the RF wheel is de-actuated since this wheel is the leading uphill wheel in the direction of the yaw. In addition, the brake actuator of the wheel diagonal to the RF wheel is de-actuated, which is the brake actuator of the LR wheel. A moment is created between the RF and LR wheels experiencing lateral grip and the opposing wheels LF and RR that are able to slide where a counter yaw is created to regain vehicle stability. By de-actuating the brake actuators of the RE wheel and LR wheel and allowing these tires to rotate, this provides an opportunity to allow the tires of the RF and LR wheels to regain lateral grip due to increasing the side friction force acting on these wheels. As a result, the diagonal brake actuator dump reduces the rearward acceleration and speed of the vehicle as compared to a full brake dump, and allows the driver to propel the vehicle up the hill. Similar to the condition described in FIG. 2, the de-actuation of the only half of the brake actuators reduce the rearward acceleration and speed of the vehicle as compared to a full brake dump, which is less startling to the driver and assists in resisting yaw, and enables the driver to apply a slower and lower throttle input, in contrast to a full brake dump, to regain an uphill movement of the vehicle.

Figure 4:
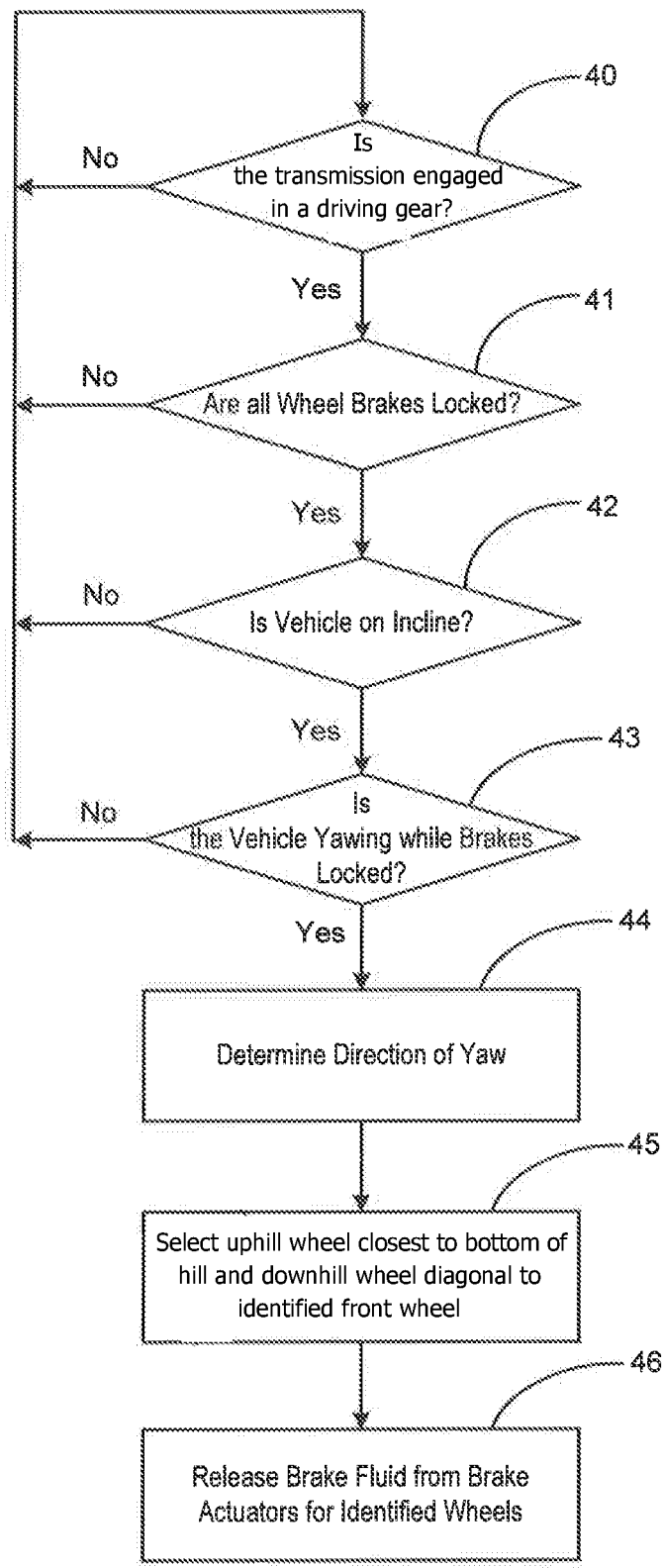
FIG. 4 illustrates a flowchart for a method of a standstill yaw mitigation technique.

FIG. 4 illustrates a flowchart for the standstill yaw mitigation technique. In block 40, a determination is made whether the transmission is engaged in a driving gear. For an automatic transmission, the driving gear may be a forward gear—e.g., F—or reverse gear—e.g., R. For a manual transmission, the driving gear may be R, 1, 2, 3, etc. If the transmission is out of park or neutral, the routine proceeds to step 41; otherwise, the routine continues to check whether the transmission is out of park or neutral.

In block 41, a determination is made whether all the vehicle brake actuators are actuated and the wheels speeds are all zero. If the this condition holds true, then the routine proceeds to step 42; otherwise, the routine returns to step 40.

In block 42, a determination is made whether the vehicle is on an inclined surface. Data from wheel speed sensors and other sensors may provide the data required to make this assessment. If the vehicle is on an incline, then the routine proceeds to step 43; otherwise, the routine returns to step 40.

In block 43, a determination is made whether the vehicle is yawing, the brake actuators are actuated, and the wheel speed sensors sense no rotation of all the wheels. If the vehicle exhibits yaw while the wheel speed sensors sense no rotation of all the wheels, then the yaw indicates that the vehicle is sliding backwards while rotating sideways down the incline and the routine proceeds to step 44; otherwise the routine proceeds to step 40.

In block 44, a direction of yaw is determined.

In block 45, an uphill wheel as determined by the direction of the yaw is identified and the downhill wheel diagonal to the identified uphill wheel are selected for brake de-actuation.

In block 46, the brake actuators of the identified uphill wheel and downhill wheel are released from their actuated state. The brake actuators on the opposing wheels on each axle are maintained for preventing rotation of the wheel and maintaining longitudinal braking force acting against a gravity force component of the hill. The release of the diagonal wheel brake actuators allows the vehicle to regain lateral grip on those two wheels to reduce yawing of the vehicle. Meanwhile, maintaining the opposing brakes helps reduce the speed and acceleration of the vehicle downhill, which is less startling to the driver of the vehicle as compared to releasing the brake actuators of all wheels during the sliding condition.

It should be understood that the technique and system may also be used on a vehicle traveling down an incline. Under such circumstances, one of the wheels on the rear axle will be the identified uphill wheel based on which rear wheel is leading the direction of the yaw. A wheel on the downhill axle diagonal to the uphill wheel is identified and these respective wheels will be de-actuated for increasing the side friction force and reducing the yawing of the vehicle.

The principle and mode of operation of this invention have been described in its various embodiments. However, it should be noted that this invention may be practiced otherwise than as specifically illustrated and described without departing from its scope.

What is claimed is:

1. A stability control system of a vehicle utilizing an electronic stability control unit that detects a yaw condition while each of the wheel brakes are actuated and the wheel speeds are zero, the electronic control unit reducing the yaw condition, the stability control system comprising:

a plurality of wheel speed sensors measuring each of the vehicle wheel speeds;

a yaw sensor sensing a yaw condition;

the electronic stability control unit including an electronic braking control module, the electronic braking control module controlling actuation and de-actuation of vehicle brakes on an inclined surface, wherein during a stop operation on the inclined surface while each wheel brake is actuated to maintain a zero wheel speed, a yaw condition is determined in response to yaw sensor data, wherein the electronic stability control unit identifies which uphill wheel is leading a direction of the yaw and identifies a wheel of an opposing axle diagonal to the identified uphill wheel, and wherein the electronic stability control unit in cooperation with the electronic braking control module de-actuates the vehicle brakes of the identified uphill wheel and diagonal wheel to increase a side friction to the identified diagonal wheels to reduce further yawing of the vehicle.

2. The stability control system of claim 1 wherein the vehicle brakes of respective wheels opposite to the identified de-actuated wheels are maintained in an actuated braking state during correction of the yawing condition.

3. The stability control system of claim 2 wherein in response to the electronic stability control unit determining the yaw condition in the clockwise direction, the electronic stability control unit identifies the right uphill wheel as the respective wheel leading the direction of the yaw, wherein the electronic braking control module de-actuates the right uphill wheel brake and a left wheel brake of the opposing axle while maintaining actuation of the brakes of the left uphill wheel and a right wheel of the opposing axle, and wherein side friction forces are increased to the right uphill wheel and left wheel of the opposing axle as a result of the de-actuation, thereby reducing further yawing of the vehicle.

4. The stability control system of claim 2 wherein the electronic stability control unit determining a yaw condition in the counterclockwise direction, the electronic stability control unit identifies the left uphill wheel as the respective wheel leading the direction of the yaw, wherein the electronic braking control module de-actuates the left uphill wheel and a right wheel of the opposite axle while maintaining actuation of the wheel brakes of the right uphill wheel and a left wheel of the opposing axle, and wherein side friction forces are increased to the left uphill wheel and right wheel of the opposite axle as a result of the de-actuation, thereby reducing further yawing of the vehicle.

5. The stability control system of claim 2 further comprising determining a slope of the vehicle relative to a horizontal plane, wherein data relating to the slope of the vehicle or road surface is provided to the electronic stability control unit for determining that the vehicle is on an inclined surface.

6. The stability control system of claim 1 wherein the electronic stability control unit controls yaw while the wheels are locked during a Hill start assist operation.

7. The stability control system of claim 1 wherein the electronic stability control unit controls yaw while the wheels are locked during a Crawl mode operation.

8. The stability control system of claim 1 wherein the electronic stability control unit controls yaw while the wheels are locked during an Auto Vehicle Hold operation.

9. The stability control system of claim 1 wherein the electronic stability control unit controls yaw while the wheels are locked during an automated cruise control operation.

10. A method of maintaining vehicle stability on an inclined surface, the vehicle including an electronic stability control unit that detects a yaw condition while each of the wheel brakes are actuated and the wheel speeds are zero, the electronic stability control unit reducing the yaw condition, the method comprising the steps of:

actuating all vehicle brakes during a Hill start assist operation;

measuring wheel speeds of each of the plurality of wheel using wheel speed sensors;

sensing, by a yaw sensor, a yawing condition of the vehicle while the wheel speed sensors indicate a zero wheel speed;

identifying, by the electronic stability control unit, which uphill wheel is leading a direction of the yaw and identifying a wheel of an opposite axle diagonal to the identified uphill wheel;

de-actuating the vehicle brakes of the identified uphill wheel and identified wheel of the opposing axle using the electronic stability control unit in cooperation with an electronic braking control module to increase a side friction of the identified wheels to reduce further yawing of the vehicle.

11. The method of claim 10 wherein the vehicle brakes of respective wheels opposite to the identified de-actuated wheels are maintained in an actuated braking state during correction of the yawing condition.

12. The method of claim 11 wherein a yawing condition in the clockwise direction is determined by the electronic stability control unit, wherein the right uphill wheel is identified as the respective wheel leading the direction of the yaw, wherein the right uphill wheel brake and a left wheel brake of the opposing axle are de-actuated while a left uphill wheel brake and right wheel brake of the opposing axle remains actuated, and wherein side friction forces are increased to the right uphill wheel and left wheel of the opposing axle as a result of the de-actuation thereby reducing further yawing of the vehicle.

13. The method of claim 11 wherein a yawing condition in the counterclockwise direction is determined by the electronic stability control unit, wherein the left uphill wheel is identified as the respective wheel leading the direction of the yaw, wherein the left uphill wheel brake and a right wheel brake of the opposing axle are de-actuated while a right uphill wheel brake and a left wheel brake of the opposing axle remains actuated, and wherein side friction forces are increased to the left uphill wheel and right wheel of the opposing axle as a result of the de-actuation, thereby reducing further yawing of the vehicle.

14. The method of claim 13 further comprising the step of determining a slope of the vehicle relative to a horizontal plane, wherein data relating to the slope of the vehicle is provided to the electronic stability control unit for determining that the vehicle is on an inclined surface.

15. The method of claim 10 wherein the yaw is controlled by the electronic stability control unit while the wheels are locked during the Hill start assist operation.

16. The method of claim 10 wherein the yaw is controlled by the electronic stability control unit while the wheels are locked during a Crawl mode operation.

17. The method of claim 10 wherein the yaw is controlled by the electronic stability control unit while the wheels are locked during an Auto Vehicle Hold operation.

18. The method of claim 10 wherein the yaw is controlled by the electronic stability control unit while the wheels are locked during an automated cruise control operation.

* * * * *